United States Patent [19]
Barshter et al.

[11] Patent Number: 5,821,114
[45] Date of Patent: Oct. 13, 1998

[54] BIOFILTER WITH MODULAR PANELS AND METHOD OF USING THE SAME

[75] Inventors: Dennis Wayne Barshter, Shamong; Michael Arthur Del Vecchio, Branchburg, both of N.J.

[73] Assignee: Envirogen, Inc., Lawrenceville, N.J.

[21] Appl. No.: 728,451

[22] Filed: Oct. 10, 1996

[51] Int. Cl.$^6$ ................................ C12S 5/00; C12M 1/20
[52] U.S. Cl. .................. 435/266; 435/289.1; 435/297.1; 435/299.1; 435/300.1; 55/483
[58] Field of Search ................................. 435/266, 299.1, 435/289.1, 300.1, 297.1; 422/120, 122; 55/483, DIG. 31

[56] References Cited

U.S. PATENT DOCUMENTS

| | | |
|---|---|---|
| 1,747,364 | 2/1930 | Greene . |
| 1,760,986 | 6/1930 | Jordahl . |
| 2,044,221 | 6/1936 | Myers et al. ................... 55/483 |
| 2,530,801 | 11/1950 | Babcock, Jr. . |
| 2,792,906 | 5/1957 | Evans ........................ 55/483 |
| 2,935,157 | 5/1960 | First ......................... 55/483 |
| 3,280,540 | 10/1966 | Soltis ........................ 55/483 |
| 3,408,438 | 10/1968 | Staunton . |
| 3,430,771 | 3/1969 | Dreher . |
| 3,707,046 | 12/1972 | De Baun . |
| 4,298,135 | 11/1981 | Vossen . |
| 4,421,534 | 12/1983 | Walker . |
| 4,662,900 | 5/1987 | Ottengraf . |
| 4,814,146 | 3/1989 | Brand et al. . |
| 5,064,763 | 11/1991 | Bentz . |
| 5,082,475 | 1/1992 | Bentz . |
| 5,445,660 | 8/1995 | Koers . |
| 5,540,028 | 7/1996 | Scott et al. . |
| 5,583,045 | 12/1996 | Finn ........................... 71/8 |
| 5,595,910 | 1/1997 | Kant et al. . |

FOREIGN PATENT DOCUMENTS

| | | |
|---|---|---|
| 34 28 798 A1 | 8/1985 | Germany . |
| 38 12 766 | 10/1989 | Germany ..................... 71/9 |
| 44 40 464 | 6/1996 | Germany . |
| 4-118015 | 4/1992 | Japan ....................... 55/483 |
| 4-183473 | 6/1992 | Japan ...................... 422/122 |
| 93/07952 | 4/1993 | WIPO ..................... 435/266 |

OTHER PUBLICATIONS

Brochure of CVT America, LLC, entitled "CVT–Biofiltration Techniques Brings a Natural End to Odors and VOC's". No Date Provided.

*Primary Examiner*—William H. Beisner
*Attorney, Agent, or Firm*—Ratner & Prestia

[57] ABSTRACT

A filter and method are provided for removing contaminants from gas. The filter includes a frame member, gas-permeable supports positioned in openings defined by the frame member, and a biofiltration material in the supports including a filter substrate and a microbial population. Contaminants are removed from gas that flows through the filter as a result of contact between the contaminants and moisture contained in the biofiltration material and are degraded by the microbial population resident therein.

18 Claims, 4 Drawing Sheets

BIOFILTER WITH MODULAR PANELS AND METHOD OF USING THE SAME

BACKGROUND OF THE INVENTION

This invention relates to an apparatus and method for treatment of contaminated gases. More particularly, this invention relates to gas treatment by biofiltration.

Field of the Invention

There has been an increased demand for systems adapted to remove contaminants from gases such as air. This increased demand is due, in part, to the enactment of strict governmental regulations regarding emissions.

Facilities that contain contaminated materials, such as storage tanks, are generally recognized as significant sources of emissions of reduced sulfur compounds, volatile organic chemicals (VOCs) and odors. Significant advances have been made to reduce such emissions since the introduction of biofiltration systems that utilize filtration material and microorganisms to combat gas contaminants.

Over the years, many attempts have been made to improve biofiltration systems. For example, U.S. Pat. No. 4,421,534 to Walker, U.S. Pat. No. 4,662,900 to Ottengraf, U.S. Pat. No. 5,064,763 to Bentz, and U.S. Pat. No. 5,082,475, also issued to Bentz, all describe systems for gas treatment using biofilters.

U.S. Pat. No. 5,445,660 to Bonno Koers, incorporated herein by reference, describes an improved apparatus for biofiltration of contaminated gases. The Koers biofilter is positioned over an air chamber into which contaminated air is delivered before it flows through the biofilter. A similar system is provided under the trademark CVT BIOSYSTEM by CVT AMERICA LLC of Lawrenceville, N.J., wherein filter modules are positioned over air chambers.

However, conventional biofiltration systems require collection and delivery of contaminated gases to the inlet of a biofilter, thereby requiring gas movers and piping systems. For example, conventional control of emissions from open-top storage tanks requires installing a cover over the tank, collecting emissions within the head space above the contaminated material, and conveying the collected emissions to a separate gas treatment system with blowers and a suitably designed piping system. Such conventional systems are expensive and can occupy a great deal of space.

Objects of the Invention

It is an object of the invention to overcome disadvantages of conventional biofiltration systems and to provide an improved biofilter and biofiltration method for removing contaminants from gas.

Other objects will be apparent to those of skill in this art in view of the following descriptions.

SUMMARY OF THE INVENTION

This invention relates to a biofilter and biofiltration method for removing contaminants from gas. The biofilter includes a frame member, gas-permeable supports and biofiltration material.

The frame member defines openings through which contaminated gas can flow. The frame member is preferably positioned over contaminated material from which the gas originates.

The gas-permeable supports are adapted for positioning at the openings in the frame member. Each gas-permeable support includes a mounting portion for engagement with the frame member. This engagement between the gas-permeable supports and the frame member encourages flow of the gas through the gas-permeable supports and discourages flow of the gas between the gas-permeable supports and the frame member.

The biofiltration material is supported by the gas-permeable supports. It includes a filter substrate and a microbial population.

In operation, the frame member and the openings defined by the frame member are preferably positioned over contaminated material. The gas-permeable supports, together with the biofiltration material, are positioned at openings defined by the frame member. Contact between the gas and the microbial population removes contaminants from the gas as it flows through the biofiltration material.

DESCRIPTION OF THE INVENTION

In the description which follows, the invention is described with respect to particular forms selected for illustration in the drawings, and specific terms are used in describing those forms. The use of such drawings and such terms is not intended to define or limit the scope of the invention, which is defined separately in the appended claims.

Figure 1:
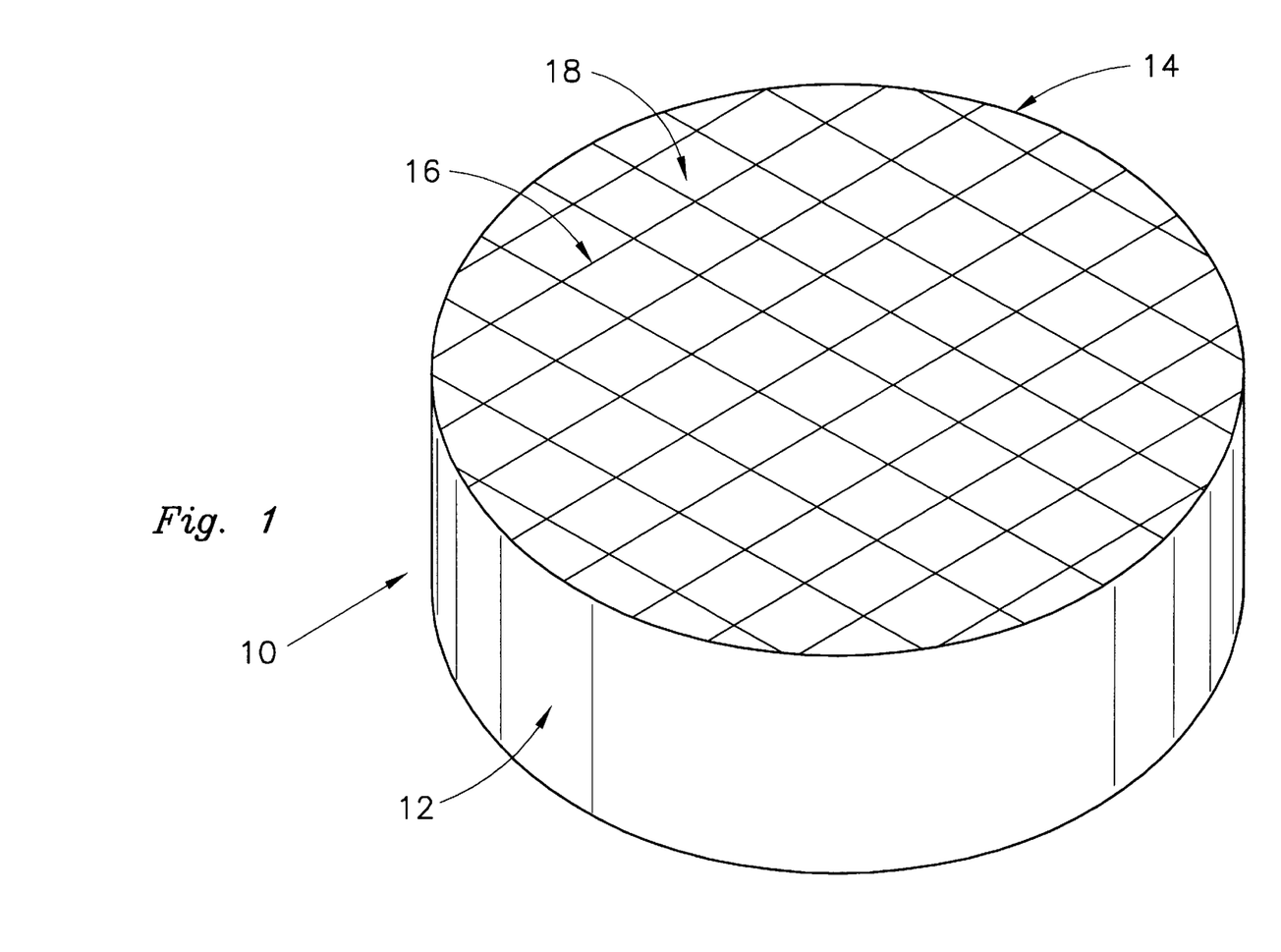
FIG. 1 is a perspective view of an embodiment of a storage facility with which this invention can be used.
Figure 2:
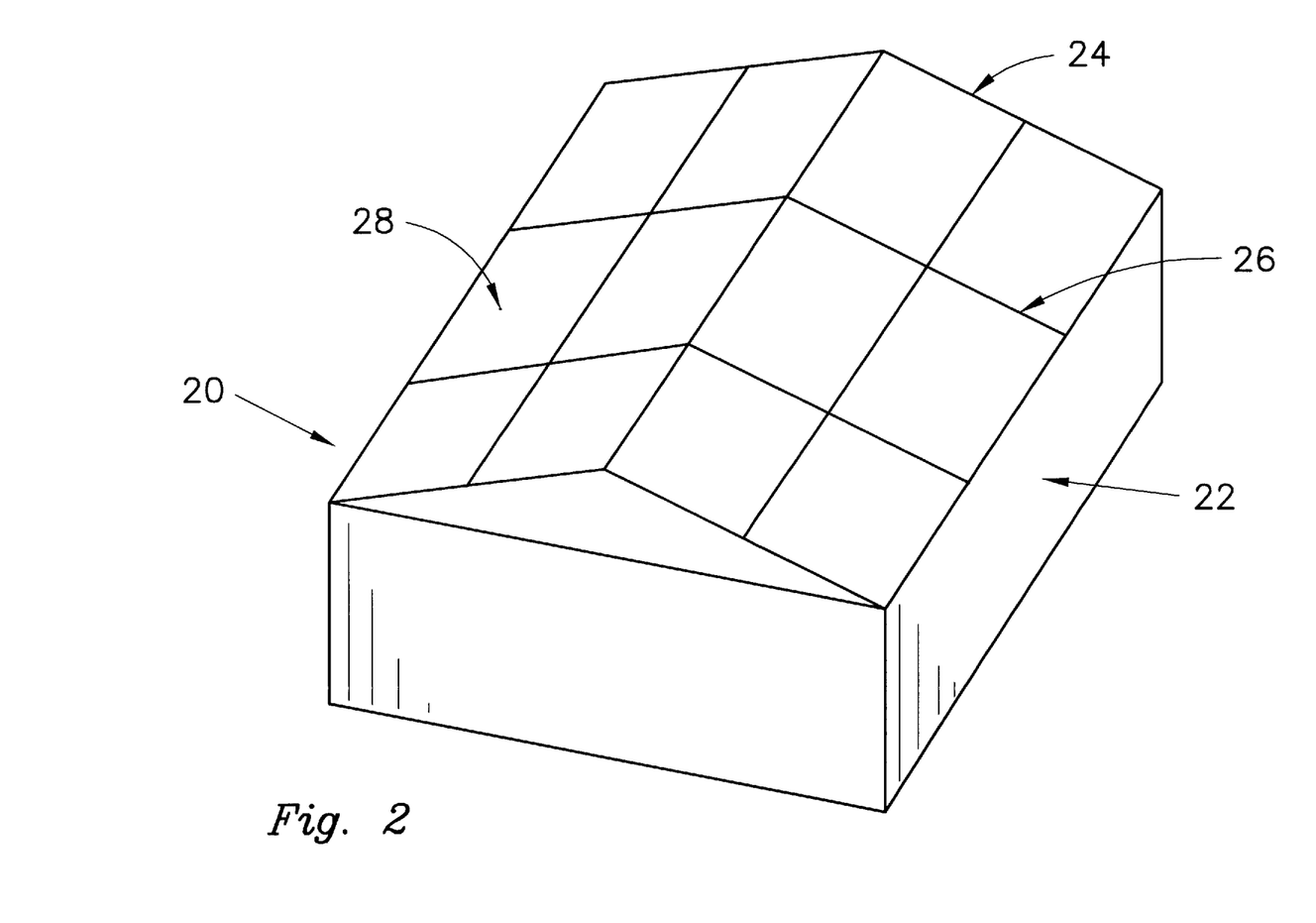
FIG. 2 is a perspective view of another embodiment of a storage facility with which this invention can be used.

The filter and method according to this invention are adapted for use with contaminated materials that may be found in storage tanks, vessels or other facilities or locations. Examples of such locations are shown in FIGS. 1 and 2 for the purpose of illustration, as will be described later. In a preferred embodiment of this invention, a biological air treatment system is integrated into a cover, thereby eliminating any need for the conveyance piping and blowers associated with conventional systems. However, the filter is optionally used in conjunction with a separate cover that may be positioned over the filter to shield against direct sunlight, excess precipitation, or other elements, depending upon the application. Also, the filter may be used in conjunction with blowers that introduce air into the head space above contaminated materials to prevent explosion of concentrated vapors in the head space or to reduce vapor concentration so that vessels can be safely entered by inspectors.

Odorous or otherwise contaminated gas or air is often the product of treatment processes such as those conducted at wastewater or soil treatment facilities. Contaminated gases are also encountered in connection with the composting, paper and pulp, food, petrochemical, printing and automotive industries, among others. Examples of gas contaminants include aliphatic hydrocarbons, aromatic hydrocarbons and chlorinated hydrocarbons. Specific examples include reduced sulfurs and volatile organic compounds (VOCs) (from wastewater, for example), ammonia (from composting, for example), mercaptans (from paper and pulp, for example), and other contaminants associated with various treatment facilities and industries. Examples of oxygenous compound contaminants include phenols, alcohols, aldehydes, ketones, formaldehydes and tetrahydrofuranes. Examples of nitrogen compound contaminants include amines, ammonia and acetone nitrate. Examples of sulfur compound contaminants include hydrogen sulfide, mercaptans and carbon disulfide.

Such odorous or otherwise contaminated gas or air often emanates from contaminated materials permanently or temporarily stored or otherwise held in storage tanks or similar vessels or facilities. Examples are shown in FIGS. 1 and 2. FIG. 1 illustrates a cylindrical storage tank 10. Such vessels are found in a wide range of sizes, perhaps as small as about 2 feet or less in diameter and perhaps as large as about 100 feet or even more in diameter. Such vessels can contain a large volume of material, perhaps 1,000,000 gallons or more of liquid, or large cubic volumes of solids or slurries.

Figure 3:
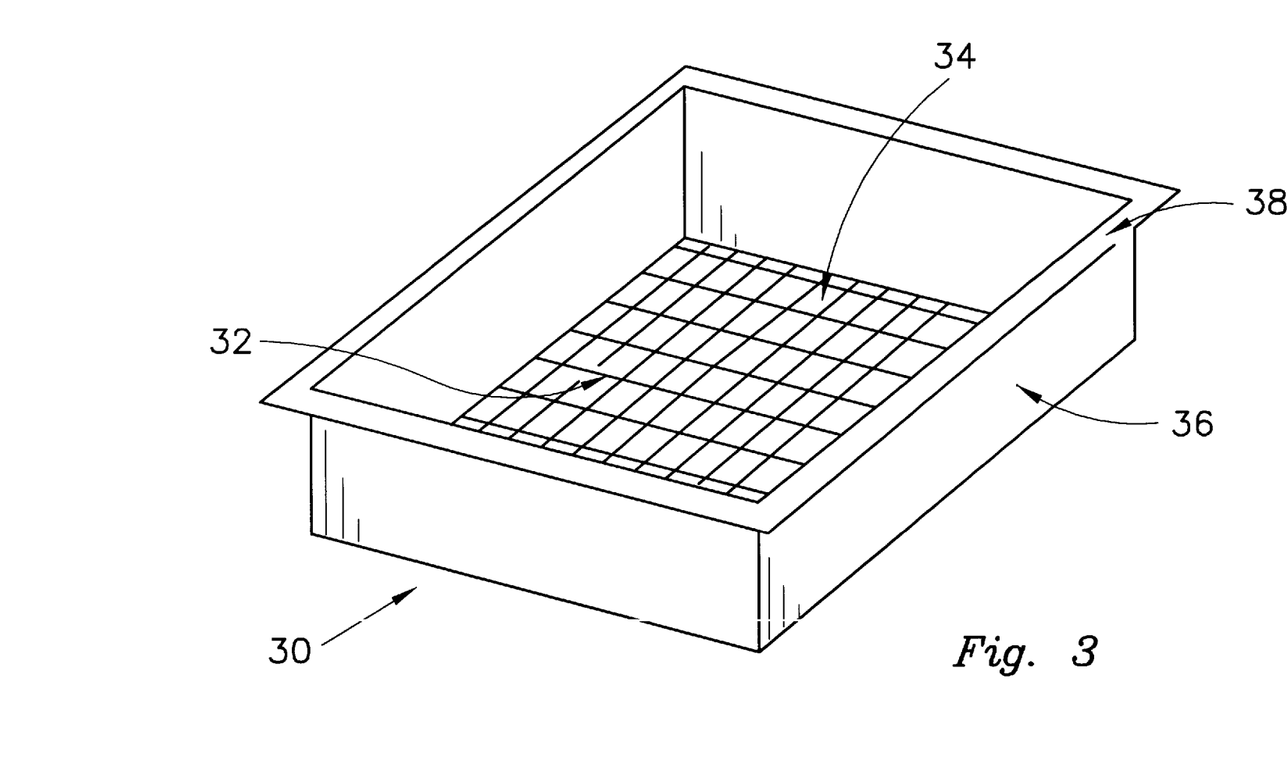
FIG. 3 is a perspective view of an embodiment of a component of a biofilter according to this invention.

Cylindrical storage tank 10 has a wall 12 and an open top. According to an embodiment of this invention, cylindrical storage tank 10 is provided with a tank cover in the form of a filter 14. Filter 14 includes a grid-like frame member 16 which defines a number of openings 18. Gas-permeable supports, an example of one of which is illustrated in FIG. 3 and described later, are intended to be positioned at some or all of the openings 18, although none are shown in FIG. 1. Also, blank panels (not shown) are optionally used to cover some of the openings 18.

Although not shown in FIG. 1, material (e.g., liquids, solids, slurries, etc.) is stored within cylindrical storage tank 10, and contaminated gas emanates from the stored material and travels up to filter 14 and through openings 18 for discharge to the atmosphere or for further handling or processing, if required.

Referring to FIG. 2, a rectangular storage vessel or facility 20 has a wall 22 and an open top. According to an embodiment of this invention, facility 20 is provided with a cover in the form of a filter 24. Such a facility may be very small or very large (perhaps up to or even exceeding several acres in area). A grid-like frame member 26, which defines a plurality of openings 28, spans the opening at the top of rectangular storage facility 20. Although not shown in FIG. 2, gas-permeable supports such as those illustrated in FIG. 3 are intended to be placed at the openings 28, or at a portion of the openings 28. Blank panels (not shown) are optionally placed in a portion of the openings 28. Material (not shown) stored in storage facility 20 is a source of contaminated gas that flows up from the stored material and through openings 28 in filter 24.

Although FIGS. 1 and 2 illustrate examples of structures with which a filter and filtration method according to the invention can be used, many other structures are contemplated as well. For example, this invention can be used with any structure, with or without walls, that is capable of holding material. The material may be stationary, flowing through or within the structure, or otherwise handled.

Referring to FIGS. 1 and 2, a filter according to this invention most preferably includes a grid-like frame that is supported by the wall or sides of a tank, vessel or other facility. The frame most preferably defines rows of openings that are positioned over a contaminated material from which contaminated gas emanates.

Also, a filter according to this invention most preferably eliminates any need for gas or air moving systems, such as systems that require the use of blowers and transport pipes to move contaminated gas from a remote location at which contaminated material is contained to a filter inlet. Instead, a filter according to this invention is most preferably integrated into the tank, vessel or other facility in which contaminated material is contained.

Referring to FIG. 3, an embodiment of a gas-permeable support, generally designated by the numeral "30", will now be described. Support 30 includes a gas-permeable portion or surface 32 which is substantially horizontal. In this embodiment of gas-permeable surface 32 are formed spaces or openings 34 to permit gas flow. Connected to gas-permeable surface 32 is a mounting portion including a wall 36 which terminates at its top edge with a lip or flange 38 that extends out from wall 36. Gas-permeable surface 32 and wall 36 together are adapted to contain biofiltration material, as will be described later. The lip 38 is adapted for engagement with the a frame member such as frame member 16 shown in FIG. 1 or frame member 26 shown in FIG. 2.

Support 30 may be formed from any material of sufficient strength to support biofiltration material. Most preferably, support 30 is formed from a plastic material such as high-density polyethylene, fiberglass reinforced polyester, or any other suitable material. Also, support 30 may be formed from a combination of materials, if desired.

Gas-permeable surface 32 is optionally formed integrally with, and/or from the same material as, the remainder of support 30. For example, support 30 is preferably molded in one piece. Alternatively, gas-permeable surface 32 can be formed from a different material. For example, a mesh, grid or permeable sheet of film is optionally connected to or forms the remainder of support 30.

Support 30 may be provided in a wide variety of sizes, shapes and configurations, depending upon the application and design preferences. In a preferred embodiment, for example, a panel about 4 feet wide, about 4 feet long and about 1 foot deep could be suitable, although many other sizes and shapes are contemplated. Whatever size and shape, the support preferably includes a portion for supporting biofiltration material and a portion for engagement with the filter's frame member.

Figure 4:
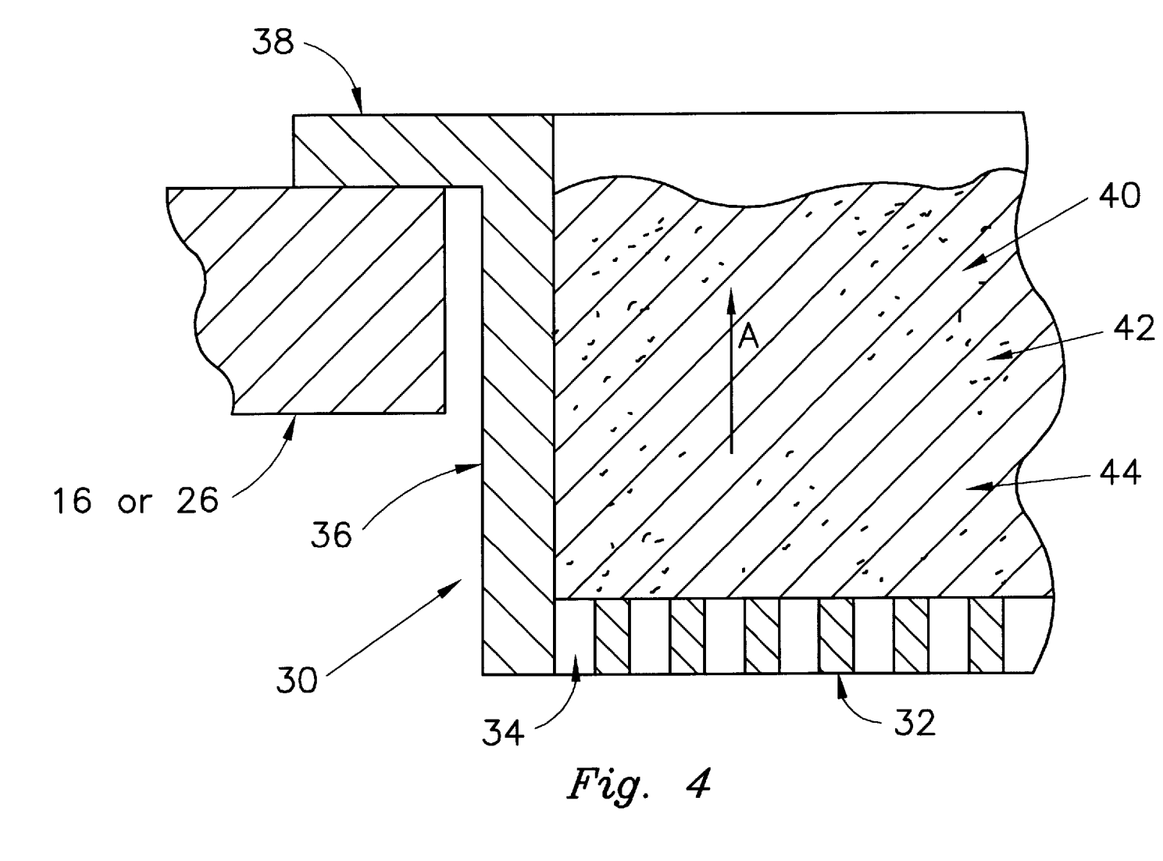
FIG. 4 is a cross-sectional side view of an embodiment of a biofilter according to this invention.

Referring now to FIG. 4, a preferred relationship between support 30 and grid 16 or 26 is described. Lip 38 of support 30 engages frame member 16 or 26 in a manner that forms a substantially gas-tight seal. For example, an interlocking arrangement such as those used for conventional fiberglass cover panels may be used. A separate or integral seal component (not shown) such as a gasket or clamp is optionally positioned at the joint between the support and frame member to obtain a substantially gas-tight seal. Although it is preferred that gas is unable to circumvent the seal, it is contemplated that some amount of gas will pass through the substantially gas-tight seal.

In the particular embodiment selected for illustration in FIG. 4, gas flowing up from contaminated material is encouraged to flow through openings 34 in gas-permeable surface 32 and upward in the direction labeled "A". Gas flow is discouraged between lip 38 of support 30 and frame member 16 or 26.

Frame member 16 or 26 may be formed from any material of sufficient strength and rigidity to support one or more of the supports together with biofiltration material. Most preferably, frame member 16 or 26 is formed from steel or steel coated with a nonmetallic material such as epoxy, but many other acceptable metallic or polymeric materials are contemplated. Also, the frame member may be configured to provide openings of any shape and size, and have any number of straight or curved sides. Whatever shape the openings take, the supports are preferably provided with a corresponding shape.

Still referring to the particular embodiment selected for illustration in FIG. 4, wall 36 and gas-permeable surface 32 cooperate to contain a biofiltration material 40. Biofiltration material 40 has as preferred components a filter substrate 42 that is inoculated with a microbial population 44. Together, support 30 and biofiltration material 40 form a filter unit.

Although various filter substrates are contemplated, filter substrate 42 is preferably an organic material into which microbe population 44 can be inoculated and within which the microbe population can thrive. Also, filter substrate 42 is preferably adapted to hold a significant amount of moisture, which is of course beneficial to microbe survival.

An inorganic filter substrate is also contemplated. For example, granulated activated carbon, open-pored sponge, packing material, and other known inorganic materials may be used as filter substrate 42.

The filter substrate is most preferably wood that will not shrink significantly with age and that is porous for water retention. One example of a suitable filtration substrate is sold under the trade name VAM Filter Material, which is currently available through CVT AMERICA, LLC, Princeton Research Center, 4100 Quakerbridge Road, Lawrenceville, N.J. 08648. Other suitable materials, available through the same source, include filtration substrates sold under the trademarks CONFIL, VAMFIL and BIOMAT. Equivalent substrates can be substituted.

Additives are optionally added to the filtration substrate to optimize performance of the biological material. For example, limestone particles are optionally added to biofiltration material 40 for applications involving removal of reduced sulfurs from contaminated gas. Also, activated carbon is optionally added to biofiltration material 40 for applications involving the removal of hydrocarbons from contaminated gas.

An appropriate microbe population is preferably selected based on the filtration substrate used as well as the contaminant or contaminants in the gas to be treated. The filtration substrate itself often contains some indigenous microbes. Preferably, indigenous microbes that are naturally occurring in the filtration substrate are supplemented by a panel of microbes inoculated into the substrate. The inoculated microbes are preferably naturally occurring microbes that are not recombinant, although recombinant microbes are contemplated. The inoculum is optionally a pure culture or a mixed culture of bacteria.

A variety of bacteria suitable for inoculation in a filtration substrate according to this invention are commercially available. One example of a suitable microbe population is available under the trademark PHENOBAC, available from Polybac, 3894 Courtney Street, Bethlehem, Pa. 18017-8999. Other suitable or equivalent microbe populations are contemplated.

Growth stimulants, nutrients and moisture are preferably added as well in any known manner, and the concentration of bacteria in the filtration substrate is preferably adjusted for the particular application. Moisture is preferably added periodically by means of sprinklers or perforated hose. Most preferably, pressure-compensated irrigation hose is used to introduce moisture.

Bacteria in the microbe population are often naturally selecting, depending upon factors such as the filtration substrate used in the biological treatment zone and the gas contaminants being treated. For example, bacteria inoculated into the filtration substrate preferably contain a variety of species. Due to a variety of factors, perhaps only a relatively small number of the species survive over time and remain to perform the task of gas decontamination. Different bacteria species or strains are expected to survive in different applications, depending upon whether or not a particular contaminant is toxic to the species or strains, whether or not species or strains can survive on a selected filtration substrate, environmental conditions, and other factors.

It is also recognized that different bacteria may perform different reactions, concurrently or separately. For example, one particular bacterial strain may convert ethanol to acetaldehyde while another bacterial strain may convert acetaldehyde to carbon dioxide and water. Other contaminants and byproducts are contemplated. For this reason, a microbe population is preferably selected based upon a variety of factors, including the selected filtration substrate and the gas contaminants to be treated.

Biofiltration material 40 is preferably provided with a depth that is selected to result in a desired nominal contact time between the contaminated gas and the biofiltration material 40 as the gas passes up through the biofiltration material. The desired depth is selected based on factors such as the surface area of the filter according to this invention, the velocity at which the gas passes through the filter, and other factors known in the art.

For example, in conventional biofilter systems, a column of biofiltration material ranging in depth from about two to about six feet might be employed. Contaminated gas is passed through the biofiltration material at a velocity so as to provide a nominal contact time between the gas and the biofiltration material of about 10 to about 60 seconds before the gas is cleaned sufficiently for discharge into the atmosphere, or for further handling or processing.

In a preferred filter according to this invention, the depth of biofiltration material 40 is most preferably established in the range from about four to about twelve inches, although other depths are contemplated depending upon the specific application. The selected depth most preferably results in a contact time between the contaminated gas and the biofiltration material in the range from about 10 to about 60 seconds. Such a contact time can be accomplished with a relatively shallow biofiltration material depth (as compared to conventional systems) because the surface area of the filter is generally larger. Also, the surface area of the filter can be adjusted to accomplish a desired contact time. For example, the surface area of the filter can be increased by replacing blank panels with filter units or decreased by replacing filter units with blank panels.

Operation of a filter and method according to this invention will now be described with general reference to the figures.

In order to accomplish the general purposes of this invention, a frame member such as grid-like frame member 16 or 26 (shown in FIGS. 1 and 2, respectively) is preferably positioned over contaminated material. For example, the frame member can be positioned over an open top of a storage tank or other facility. Alternatively, it is placed over any body of contaminated material. Within the openings defined by the frame member, such as openings 18 or 28, are positioned gas-permeable supports such as the support 30 shown and described with reference to FIG. 3. Biofiltration material, including a filter substrate and a microbial population, is placed within the support before or after the support is installed into the frame member.

The supports are installed into the openings in such a manner that a substantially gas-tight seal is created between the supports and the frame member. As used herein, the term "substantially gas-tight seal" is intended to mean a seal sufficient to encourage gas flow through the supports and through the biofiltration material, and sufficient to discourage gas flow that would circumvent the biofiltration material by flowing between the supports and the frame member. The gas is contacted by the microbe population in the biofiltration material, thereby inducing a biological reaction between the microbe population and contaminants in the gas. More specifically, contaminants are adsorbed and/or absorbed into the moist biofiltration material. Thereafter, contaminants are degraded by the microbial population inoculated into the biofiltration material.

The supports are preferably modular in construction so that they can be removed and replaced for maintenance, repair, or for any other reason. Most preferably, the supports are movable by a small crane or even manually, even after the supports are supplied with inoculated biofiltration material.

Many modifications to the embodiments described herein may be made without departing from the spirit or scope of this invention as it is defined in the appended claims. For example, the physical structure of the filter described herein may be changed with regard to its size, shape, materials, construction and other aspects, so long as it can engage one or more filter units. Also, a filter according to this invention can be used with any type of storage tank or facility, or with any type of cover or roof over a confined or open space, that completely or partially contains contaminated material. It is not necessary for the filter to cover the entire area of such a space and may, in some applications, cover only a small portion of its area. Although modular construction is preferred, a permanent structure is also contemplated.

Also, the method steps are optionally performed in any order. For example, the filter substrate can be inoculated with microbes before or after the filter substrate is made a part of a filter unit. Also, the filter substrate can be made a part of a filter unit before or after the filter unit is engaged by a filter frame.

What is claimed is:

1. A biofilter for removing contaminants from a gas comprising:
    a frame member defining openings through which said gas can flow;
    gas-permeable supports each positioned at one of said openings defined by said frame member and each being constructed and arranged to at least partially traverse said openings, each of said gas-permeable supports comprising a mounting portion positioned for engagement with said frame member, wherein said engagement between said mounting portion and said frame member encourages flow of said gas through said gas-permeable supports and discourages flow of said gas between said gas-permeable supports and said frame member;
    a filter substrate supported by each of said gas-permeable supports; and
    a microbial population supported by said filter substrate;
    wherein contact between said gas and said microbial population removes contaminants from said gas as said gas flows through said filter substrate.

2. The biofilter defined in claim 1, wherein said frame member comprises a grid-like structure.

3. The biofilter defined in claim 1, wherein said mounting portion of each of said gas-permeable supports comprises a flange extending outwardly for engagement with said frame member.

4. The biofilter defined in claim 1, wherein each of said gas-permeable supports comprises a substantially horizontal surface defining a plurality of spaces through which said gas flows.

5. The biofilter defined in claim 1, wherein said filter substrate comprises an organic filtration material.

6. The biofilter defined in claim 1, wherein said gas-permeable supports have a modular construction for removal and replacement of said gas-permeable supports with respect to said frame member.

7. A biofilter for positioning over a contaminated material and for removing contaminants from gas emanating from said contaminated material, said biofilter comprising, in combination:
    a frame member substantially covering said contaminated material, said frame member defining a plurality of openings; and
    a plurality of filter units, each of said filter units being positioned at one of said openings defined by said frame member, each of said filter units comprising a gas-permeable support constructed and arranged to permit gas flow therethrough and to at least partially traverse said openings, a filter substrate supported adjacent to said gas-permeable support, a microbial population supported by said filter substrate, and a mounting portion shaped for engagement with said frame member to create a substantially gas-tight seal between each of said filter units and said frame member, wherein flow of said gas is encouraged through said filter units and flow of said gas is discouraged between said filter units and said frame member;
    wherein contact between said gas and said microbial population removes contaminants from said gas as said gas flows through said filter units.

8. The biofilter defined in claim 7, wherein said filter units have a modular construction for removal and replacement of said filter units with respect to said frame member.

9. The biofilter defined in claim 7, wherein said mounting portion of each of said filter units comprises a flange positioned for engagement with a surface of said frame member.

10. The biofilter defined in claim 7, wherein each of said filter units comprises a wall for containment of said filter substrate.

11. The biofilter defined in claim 7, wherein said mounting portion of each of said filter units comprises a seal member for sealed contact with said frame member.

12. A method for removing contaminants from a gas emanating from a contaminated material using a filter having a frame member defining openings, gas-permeable supports sized and shaped for positioning at said openings, a filter substrate, and a microbial population, said method comprising the steps of:
    (a) positioning said frame member and said openings so that said gas emanating from said contaminated material flows through said openings;
    (b) inoculating said microbial population onto said filter substrate;
    (c) supporting said filter substrate by a plurality of said gas-permeable supports;
    (d) placing said gas-permeable supports at least a portion of said openings defined by said frame member, said gas-permeable supports being constructed and arranged to at least partially traverse said openings; and
    (e) causing contact between said contaminants in said gas and said microbial population, thereby removing contaminants from said gas as it flows through said filter substrate.

13. The method defined in claim 12, further comprising the step of creating a substantially gas-tight seal between said gas-permeable supports and said frame member, thereby encouraging flow of said gas through said gas-permeable supports and discouraging flow of said gas between said gas-permeable supports and said frame member.

14. The method defined in claim 12, further comprising the step of maintaining a filter substrate depth to provide a predetermined contact duration between said gas and said filter substrate.

15. The method defined in claim 14, wherein said predetermined contact duration is in the range from about 10 seconds to about 60 seconds.

16. A method for removing contaminants from a gas emanating from contaminated material comprising the steps of:
   (a) installing a frame member over said contaminated material, said frame member defining openings through which said gas flows;
   (b) providing filter units sized and shaped to occupy at least a portion of said openings defined by said frame member, each of said filter units including a gas-permeable surface constructed and arranged to at least partially traverse said openings, a filtration substrate and a microbial population inoculated onto said filtration substrate;
   (c) positioning said filter units at least a portion of said openings and creating a substantially gas-tight seal between said filter units and said frame member; and
   (d) contacting said contaminants in said gas with said microbial population as said gas flows through said filter units, thereby removing contaminants from said gas.

17. The method defined in claim 16, further comprising the step of maintaining a filtration substrate depth in said filter units to provide a predetermined contact duration between said gas and said filtration substrate.

18. The method defined in claim 17, wherein said predetermined contact duration between said gas and said filtration substrate is in the range from about 10 seconds to about 60 seconds.

* * * * *

UNITED STATES PATENT AND TRADEMARK OFFICE
CERTIFICATE OF CORRECTION

PATENT NO. : 5,821,114
DATED : October 13, 1998
INVENTOR(S) : Dennis Wayne Barshter and Michael Arthur Del Vecchio It is certified that error appears in the above-identified patent and that said Letters Patent is hereby corrected as shown below:

In claim 12 at column 8, line 57, of the Letters Patent, after "supports" and before "at" insert -- at --.

In claim 16 at column 10, line 5, of the Letters Patent, after "units" and before "at" insert -- at --.

Signed and Sealed this

First Day of June, 1999

*Attest:*

Q. TODD DICKINSON

*Attesting Officer*     *Acting Commissioner of Patents and Trademarks*